United States Patent
Zhang et al.

(10) Patent No.: US 10,075,428 B2
(45) Date of Patent: *Sep. 11, 2018

(54) TIME CHECK METHOD AND BASE STATION

(71) Applicant: Huawei Technologies Co., Ltd., Shenzhen (CN)

(72) Inventors: Weiwei Zhang, Shenzhen (CN); Guoliang Nie, Shanghai (CN); Zhongyu Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 592 days.

This patent is subject to a terminal disclaimer.

(21) Appl. No.: 14/614,845

(22) Filed: Feb. 5, 2015

(65) Prior Publication Data

US 2015/0149770 A1    May 28, 2015

Related U.S. Application Data

(63) Continuation of application No. 13/353,912, filed on Jan. 19, 2012, now Pat. No. 8,984,654, which is a
(Continued)

(30) Foreign Application Priority Data

Jun. 30, 2010    (CN) .......................... 2010 1 0218676

(51) Int. Cl.
*H04L 29/06*    (2006.01)
*H04L 29/08*    (2006.01)
(Continued)

(52) U.S. Cl.
CPC .......... *H04L 63/0823* (2013.01); *H04L 67/06* (2013.01); *H04L 69/28* (2013.01);
(Continued)

(58) Field of Classification Search
CPC ...... H04L 63/0823; H04L 67/06; H04L 69/28
See application file for complete search history.

(56) References Cited

U.S. PATENT DOCUMENTS 5,673,259 A    9/1997   Quick, Jr.
6,754,470 B2   6/2004   Hendrickson et al.
(Continued)

FOREIGN PATENT DOCUMENTS

CN    1756123 A     4/2006
CN    101420269 A   4/2009
(Continued)

OTHER PUBLICATIONS

Mills, "Network Time Protocol (Version 3) Specification, Implementation and Analysis," Network Working Group, Mar. 1992, 107 pages.

(Continued)

*Primary Examiner* — Brandon Hoffman
*Assistant Examiner* — Thong Truong
(74) *Attorney, Agent, or Firm* — Brinks Gilson & Lione (57) ABSTRACT

A time check method and a base station are provided. The base station receives an authentication interaction message sent by an authentication interaction device; extracts time information in the authentication interaction message; and uses the time information to check local time. Before an Internet Key Exchange (IKE) connection is set up between the base station and a security gateway, relatively accurate time is obtained from an external authentication interaction device and is used for aligning the local time. Therefore, the cost of installing a clock component and a battery is saved, the time on the base station is trustworthy, and the security gateway is authenticated securely.

12 Claims, 6 Drawing Sheets

Related U.S. Application Data continuation of application No. PCT/CN2011/075201, filed on Jun. 2, 2011.

(51) Int. Cl.
*H04W 24/02* (2009.01)
*H04W 88/08* (2009.01)
*H04J 3/06* (2006.01)

(52) U.S. Cl.
CPC ....... *H04J 3/0658* (2013.01); *H04L 2463/121* (2013.01); *H04W 24/02* (2013.01); *H04W 88/08* (2013.01); *Y02D 70/00* (2018.01); *Y02D 70/1262* (2018.01); *Y02D 70/142* (2018.01); *Y02D 70/164* (2018.01)

(56) References Cited

U.S. PATENT DOCUMENTS

| | | |
|---|---|---|
| 2001/0009025 A1 | 7/2001 | Ahonen |
| 2004/0227972 A1* | 11/2004 | Uchikawa ............. G06F 3/1207 358/1.14 |
| 2006/0155855 A1 | 7/2006 | Hamai |
| 2008/0032736 A1 | 2/2008 | Bari et al. |
| 2008/0034204 A1* | 2/2008 | Lakshminarayanan ...................... H04L 63/0823 713/158 |
| 2008/0306710 A1* | 12/2008 | Holtzman ............... G06F 21/10 702/178 |
| 2009/0227234 A1* | 9/2009 | Bosch ................. H04L 63/0428 455/411 |
| 2010/0034539 A1 | 2/2010 | Ko et al. |
| 2010/0135336 A1 | 6/2010 | Zhou et al. |
| 2011/0158364 A1 | 6/2011 | Fullam |
| 2011/0225424 A1* | 9/2011 | Zee ....................... H04L 63/061 713/171 |
| 2012/0105277 A1 | 5/2012 | Ling et al. |
| 2012/0124673 A1 | 5/2012 | Zhang et al. |

FOREIGN PATENT DOCUMENTS

| | | |
|---|---|---|
| CN | 101420747 A | 4/2009 |
| CN | 101515831 A | 8/2009 |
| CN | 101909053 A | 12/2010 |
| RU | 2209528 C2 | 7/2003 |
| WO | WO 2010054546 A1 | 5/2010 |

OTHER PUBLICATIONS

3rd Generation Partnership Project, "Technical Specification Group Service and System Aspects; Security of H(e)NB" (Release 8) 3GPP TR 33.820. V8.3.0, Dec. 2009, 99 pages.

* cited by examiner

TIME CHECK METHOD AND BASE STATION

CROSS-REFERENCE TO RELATED APPLICATIONS

This application is a continuation of U.S. patent application Ser. No. 13/353,912, filed on Jan. 19, 2012, which is a continuation of International Application No. PCT/CN2011/075201, filed on Jun. 2, 2011. The International Application claims priority to Chinese Patent Application No. 201010218676.X, filed on Jun. 30, 2010. The afore-mentioned patent applications are hereby incorporated by reference in their entireties.

FIELD

The present disclosure relates to the field of communications technologies, and in particular, to a time check method and a base station.

BACKGROUND

In an LTE (long term evolution, long term evolution) security architecture, a security system is divided into three parts: a radio plane, a transmission plane, and a maintenance plane.

To tackle transmission threats, a base station (Evolved NodeB, base station) uses an IPSec (IP Security) mechanism to ensure secrecy, integrity and availability of transmission. The IPSec mechanism uses IKE (internet key exchange, internet key exchange) negotiation to perform bidirectional authentication between nodes.

In a scenario that a security gateway (security gateway) exists, when the base station needs to be connected with the security gateway through IKE, the base station downloads a CRL (certificate revocation list, certificate revocation list) file from a CRL server first, and then uses the CRL file to authenticate a digital certificate of the security gateway. In the authentication process, the local time of the base station is used as a basis for judging whether the digital certificate of the security gateway is in a validity period.

Generally, a time server is located in a core network after the security gateway. After an IKE connection is set up between the base station and the security gateway, the local time of the base station may be checked against the time of the time server in the core network.

Currently, in the case that the base station is powered off or stops service interaction with the security gateway in a long time, the time on the base station is reset to a default value (such as January 2008). If the time of the base station is not checked through a GPS (global positioning system, global positioning system), the base station is unable to obtain the time on the time server before connecting to the security gateway. Consequently, the local time of the base station is not correct, and the actually valid digital certificate of the security gateway is unable to pass the authentication, or the actually expired digital certificate of the security gateway passes the authentication, which imposes security threats.

A solution in the prior art is: installing a clock component powered by a battery on the base station. The base station reads correct time from the clock component to align the local time.

In the implementation of the present disclosure, the inventor finds at least the following defects in the prior art.

In the solution put forward in the prior art, a time component and a battery need to be installed on the base station additionally, which increases the cost. Moreover, after the base station is connected with the security gateway, the base station checks time through the time server once obtaining the address of the time server, and the base station does not need the clock component any longer, which leads to waste of resources.

SUMMARY

Embodiments of the present disclosure provide a time check method and a base station, so that the base station obtains relatively accurate time for time check before connecting to a time server, without involving installation of any clock component.

A time check method provided in an embodiment of the present disclosure for a base station. First, the base station receives an authentication interaction message sent by an authentication interaction device. The base station then extracts time information in the authentication interaction message and uses the time information to check a local time.

A base station provided in an embodiment of the present disclosure includes: a receiving unit, configured to receive an authentication interaction message sent by an authentication interaction device; an extracting unit, configured to extract time information in the authentication interaction message; and an aligning unit, configured to use the time information to check a local time of the base station.

Through the time check method and the base station disclosed herein, before an IKE connection is set up between the base station and the security gateway, relatively accurate time is obtained from an external authentication interaction device and is used for aligning the local time. Therefore, the cost of installing the clock component and the battery is saved, the time on the base station is trustworthy, and the security gateway is authenticated securely.

DETAILED DESCRIPTION OF THE EMBODIMENTS

To make the objectives, features and merits of the solutions of the present disclosure clearer, the following describes the embodiments of the present disclosure in more detail with reference to the accompanying drawings. Similar features may be referenced back to the prior descriptions in a prior numbered drawing or referenced ahead to a higher numbered drawing. Unless otherwise specified, all technical and scientific terms herein may have the same meanings as understood by a person skilled in the art.

Embodiment 1

Figure 1:
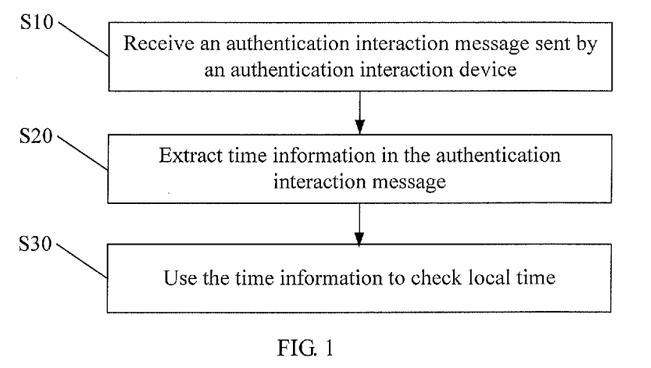
FIG. 1 is a schematic flowchart of a time check method according to a first embodiment of the present disclosure.
Figure 7:
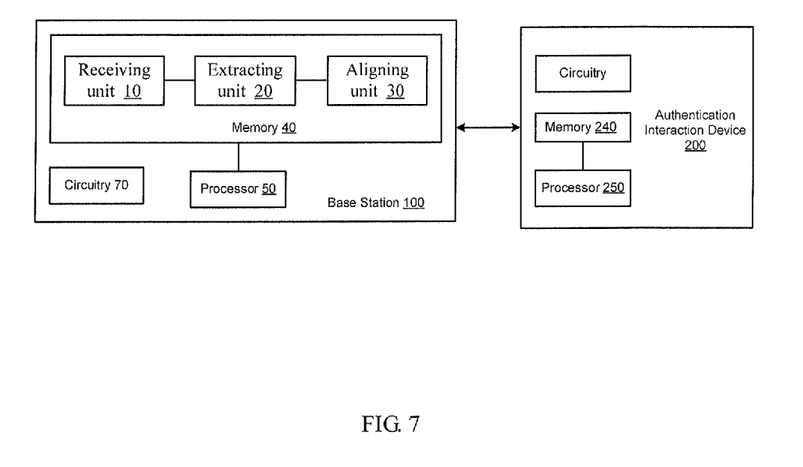
FIG. 7 is a schematic structural diagram of a base station according to an embodiment of the present disclosure.

As shown in FIG. 1, a time check method provided in this embodiment includes the following steps. To help better understanding, relevant features in FIG. 7 are referenced to at least once in the description.

S10: Receive an authentication interaction message sent by an authentication interaction device 200.

The authentication interaction device 200 may be a CRL server, a security gateway, and the like. The authentication interaction device 200 has at least a memory 240 and a processor 250. The authentication interaction message is a message destined for a base station 100 among interaction messages between the authentication interaction device 200 and the base station 100 before an IKE connection is set up between the base station 100 and a security gateway (which may be connected through a network) successfully.

S20: Extract time information in the authentication interaction message.

In this embodiment, the time information varies with the authentication interaction device and the authentication interaction message. For example, if the authentication interaction device is a CRL server and the authentication interaction message is a download response sent by the CRL server, the time information is update time of a CRL file; while if the authentication interaction device is a CRL server and the authentication interaction message is a first FTP handshake response, the time information is current time on the CRL server.

S30: Use the time information to check local time.

After the base station 100 obtains relatively accurate time information, the local time of the base station may be checked, and therefore, the base station 100 may authenticate the security gateway securely and reliably.

Through the time check method in this embodiment, before an IKE connection is set up between the base station 100 and the security gateway, relatively accurate time is obtained from an external authentication interaction device and is used for aligning the local time. Therefore, the cost of installing the clock component and the battery is saved, the time on the base station is trustworthy, and the security gateway is authenticated securely.

Embodiment 2

Figure 2:
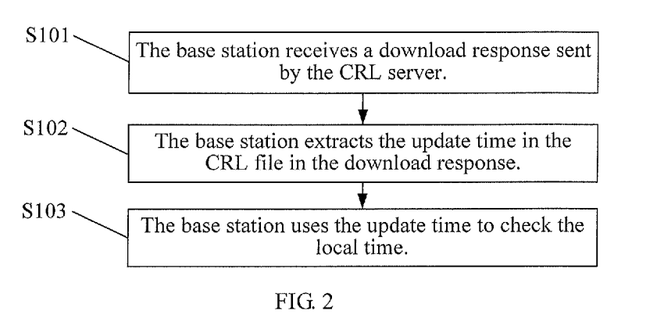
FIG. 2 is a schematic flowchart of a time check method according to a second embodiment of the present disclosure.

As shown in FIG. 2, a time check method provided in this embodiment includes the following steps.

S101: The base station 100 receives a download response sent by the CRL server (such as the authentication interaction device 200).

Before authenticating the security gateway, the base station 100 needs to obtain a CRL file. Therefore, after finishing FTP handshake with the CRL server, the base station sends a download request to the CRL server. The CRL server sends a download response that carries the CRL file to the base station.

S102: The base station extracts the update time in the CRL file in the download response.

The CRL file includes a time field, and the CRL server updates the CRL file periodically. The update period is short (generally a few hours). This relatively accurate time is enough for meeting authentication requirements of the base station. Because a validity period of a digital certificate of the security gateway is not so short as a few hours, the authentication of the digital certificate of the security gateway is surely effective as long as the difference between the time obtained from the CRL file and the actual current time is smaller than the validity period of the digital certificate of the security gateway. Therefore, time field information in the CRL file may be obtained to check time of the base station, so that the local time of the base station is aligned with relatively accurate time.

The following shows an example of the structure of a CRL file. In this structure, a field "thisUpdate" indicates the update date of the CRL file (the CRL file is updated periodically, and this time field indicates the time of update).

```
typedef struct stCRLInfo
{
        SEC_AsnInt* pVersion;   /*if present, MUST be v2*/
        SEC_ALG_IDENTIFIER_S* pstSignatureAlgo; /*The signatureAlgorithm field
contains the algorithm identifier for the algorithm used by the CRL issuer to sign the
CertificateList.*/
        SEC_NAME_S* issuer; /*The issuer field identifies the entity who has signed
and issued the CRL.*/
        SEC_TIME_S* thisUpdate; /*This field indicates the issue date of this CRL.*/
        SEC_TIME_S* nextUpdate; /*This field indicates the date by which the next
CRL will be issued. It is optional*/
        X509_REVOKED_LIST* revokedCertificates; /*List of revoked certificates
nodes. It is optional */
        Extensions*   crlExtensions;   /*The X.509 v2 CRL format also allows
communities to define private extensions to carry information unique to those communities.
It is optional*/
        } X509_CRLINFO_S;
```

S103: The base station uses the update time to check the local time.

After an IKE connection is set up between the base station and the security gateway successfully, the base station obtains the address of the time server from a network management system, stops checking the local time of the base station by using the CRL file, but checks time against the time server.

The time check method in this embodiment makes use of the existing messages and procedures, involves no modification of the existing messages or procedures, and is easy to implement.

Through the time check method in this embodiment, the update time is extracted from the CRL file in the download response received from the CRL server. Therefore, before an IKE connection is set up between the base station and the security gateway successfully, the base station obtains relatively accurate time for aligning the local time. In this way, the cost of installing the clock component and the battery is saved, the time on the base station is trustworthy, and the security gateway is authenticated securely.

Embodiment 3

Figure 3:
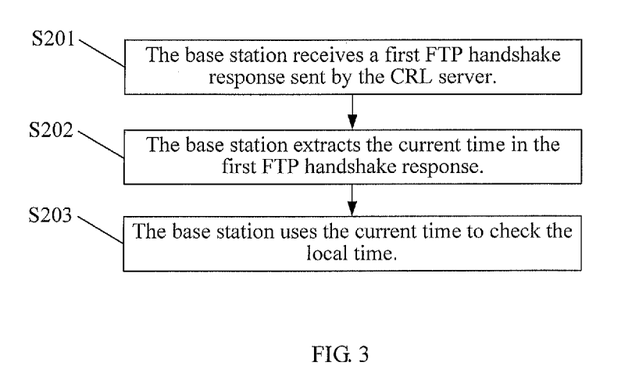
FIG. 3 is a schematic flowchart of a time check method according to a third embodiment of the present disclosure.

As shown in FIG. 3, a time check method provided in this embodiment includes the following steps.

S201: The base station receives a first FTP handshake response from the CRL server. The first FTP handshake response carries the current time.

Before the base station obtains a CRL file from the CRL server, the base station needs to set up an FTP connection through three FTP handshakes with the CRL server. First, the base station sends a first FTP handshake request to the CRL server. After receiving the first FTP handshake request, the CRL server returns a first FTP handshake response to the base station. The first FTP handshake response also carries a second FTP handshake request of the CRL server. After receiving the second FTP handshake request, the base station returns a second FTP handshake response to the CRL server, and then an FTP connection is set up between the base station and the CRL server.

Figure 4:
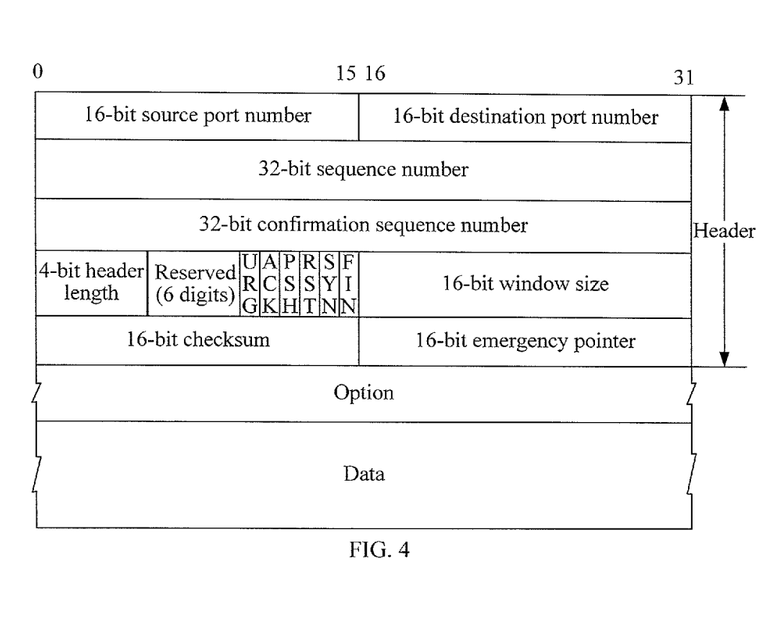
FIG. 4 is a schematic structural diagram of a message header of a first FTP handshake response.

The time on the CRL server is regarded as relatively accurate. Therefore, the relatively accurate time may be obtained from the CRL server. In this embodiment, the first FTP handshake response carries the current time on the CRL server. In practice, a time field may be added in the structure of the first FTP handshake response message. For example, FIG. 4 shows a message header of the first FTP handshake response, and the time field may be located at the message header of the first FTP handshake response. The specific location of the time field is not limited, and may be set according to the specific scenario, so long as the time field is located at the message header of the first FTP handshake response. The time field may be in any form so long as it carries the current time on the CRL server. The current time may also be carried in an idle field of the structure of the first FTP handshake response message.

S202: The base station extracts the current time in the first FTP handshake response.

S203: The base station uses the current time to check the local time.

After an IKE connection is set up between the base station and the security gateway successfully, the base station obtains the address of the time server from a network management system, and checks time against the time server.

Through the time check method in this embodiment, the first FTP handshake response carries the current time of the CRL server. Therefore, before an IKE connection is set up between the base station and the security gateway successfully, the base station obtains relatively accurate time for aligning the local time. In this way, the cost of installing the clock component and the battery is saved, the time on the base station is trustworthy, and the security gateway is authenticated securely.

Embodiment 4

Figure 5:
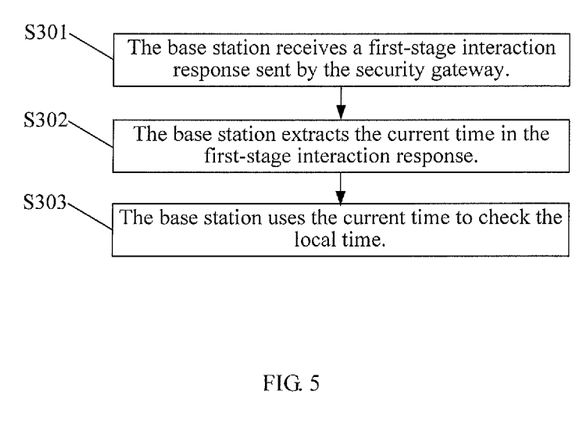
FIG. 5 is a schematic flowchart of a time check method according to a fourth embodiment of the present disclosure.

As shown in FIG. 5, a time check method provided in this embodiment includes the following steps.

S301: The base station receives a first-stage interaction response sent by the security gateway. The first-stage interaction response carries the current time.

Two stages are involved in setting up an IKE connection between the base station and the security gateway. The first stage is to negotiate setup of an IKE SA (security association) of a communication channel, authenticate the communication channel, and provide secrecy, message integrity and message source authentication service for further IKE communication between both parties. The second stage is to set up an IPsec SA by using the existing IKE SA.

The security gateway is connected with a time server, and the time on the security gateway is accurate. Therefore, correct time may be obtained from the security gateway. Because the second stage occurs upon a condition that the security gateway passes the security authentication of the base station, the interaction response in the first stage is used to carry the current time on the security gateway in this embodiment.

The first stage involves three messages: a policy negotiation exchange request, an exchange response of a Diffie-Hellman shared value and a nonce value, and an identity authentication exchange response. The exchange response of a Diffie-Hellman shared value and a nonce value may carry the current time on the security gateway. Therefore, the first-stage interaction response may be the exchange response of a Diffie-Hellman shared value and a nonce value.

Figure 6:
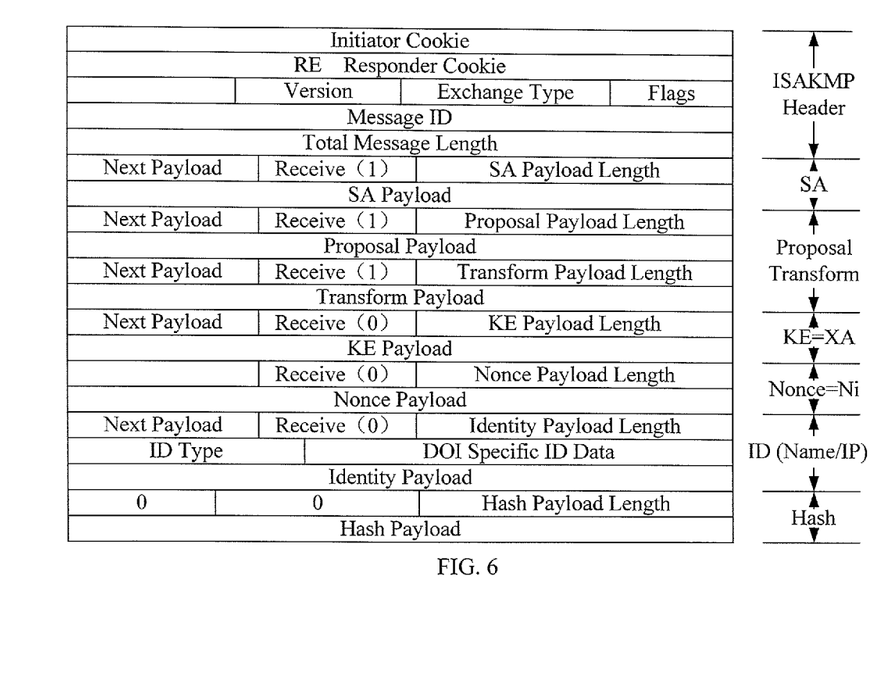
FIG. 6 is a schematic structural diagram of a message of an exchange response of a Diffie-Hellman shared value and a nonce value.

In practice, a time field may be added in the structure of the first-stage interaction response message to carry the current time on the security gateway. For example, FIG. 6 shows the structure of a message of an exchange response of a Diffie-Hellman shared value and a nonce value. The time field may be added in the exchange response of a Diffie-Hellman shared value and a nonce value. The specific location of the time field is not limited as long as the time field is located in the exchange response of a Diffie-Hellman shared value and a nonce value. The location of the time field may be set according to the specific scenario, and the time field may be in any form so long as it carries the current time on the security gateway. The current lime may also be carried in an idle field of the structure of the first-stage interaction response message.

S302: The base station extracts the current time in the first-stage interaction response.

S303: The base station uses the current time to cheek the local time.

After an IKE connection is set up between the base station and the security gateway successfully, the base station obtains the address of the time server from a network management system, and checks time against the time server.

Through the time check method in this embodiment, the first-stage interaction response carries the current time on the security gateway. Therefore, before an IKE connection is set up between the base station and the security gateway successfully, the base station obtains relatively accurate time for aligning the local time. In this way, the cost of installing the clock component and the battery is saved, the time on the base station is accurate, and the security gateway is authenticated reliably.

Embodiment 5

As shown in FIG. 7, a base station 100 provided in this embodiment includes: at least a memory 40, a processor 50, a receiving unit 10, an extracting unit 20, and an aligning unit 30 and related circuitry 70. In an embodiment, the receiving unit 10, the extracting unit 20 and the alignment unit 30 may be program codes embedded in firmware or in software stored in the memory 40 to perform configured functions in conjunction with circuitry 70, when executed by the processor 50.

The receiving unit 10 is configured to receive an authentication interaction message sent by an authentication interaction device.

The authentication interaction device 200 may be a CRL server, a security gateway, and on the like. The authentication interaction message is a message destined for the base station among interaction messages between the authentication interaction device 200 and the base station 100 before an IKE connection is set up between the base station and the security gateway successfully.

The extracting unit 20 is configured to extract time information in the authentication interaction message.

The time information varies with the authentication interaction device and the authentication interaction message. For example, if the authentication interaction device 200 is a CRL server and the authentication interaction message is a download response sent by the CRL server, the time information is update time of a CRL file; while if the authentication interaction device is a security gateway and the authentication interaction message is a first-stage interaction response, the time information is current time on the security gateway.

The aligning unit 30 is configured to use the time information to check local time of the base station 100.

Optionally, the receiving unit 10 includes a first receiving unit, configured to receive a download response sent by the CRL server; and the extracting unit 20 includes a first extracting unit, configured to extract the update time in the CRL file in the download response as the time information.

Optionally, the receiving unit 10 includes a second receiving unit, configured to receive a first FTP handshake response sent by the CRL server, where the first FTP handshake response carries the current time; and the extracting unit 20 includes a second extracting unit, configured to extract the current time in the first FTP handshake response as the time information.

Optionally, the receiving unit 10 includes a third receiving unit, configured to receive a first-stage interaction response sent by the security gateway, where the first-stage interaction response carries the current time; and the third receiving unit is configured to receive an exchange response of a Diffie-Hellman shared value and a nonce value from the security gateway. The extracting unit 20 includes a third extracting unit, configured to extract the current time in the first-stage interaction response as the time information.

After an IKE connection is set up between the base station 100 and the security gateway successfully, the base station 100 obtains the address of the time server from a network management system, and checks time against the time server.

Through the base station 100 in this embodiment, before an IKE connection is set up between the base station 100 and the security gateway, relatively accurate time is obtained from an external authentication interaction device and is used for aligning the local time. Therefore, the cost of installing the clock component and the battery is saved, the time on the base station is trustworthy, and the security gateway is authenticated securely.

Persons of ordinary skill in the art should understand that all or a part of the steps of the method specified in any embodiment above may be implemented by a program instructing relevant hardware such as a server having a processor. The program may be stored in a non-transitory computer readable storage medium such as a ROM/RAM, a magnetic disk or a CD-ROM accessible by the processor. When the program runs, the steps executed by the program include: receiving an authentication interaction message sent by an authentication interaction device; extracting time information in the authentication interaction message; and using the time information to check local time.

In the description herein, the term like "first" and "second" is only used to differentiate one entity or operation from another, but is not necessarily construed as any practical relationship or order between the entities or operations. Moreover, the terms "include", "comprise" and any variation thereof refer to "including but not limited to". Therefore, in the context of a process, method, object or device that includes a series of elements, the process, method, object or device not only includes such elements, but also includes other elements not specified expressly, or may include inherent elements of the process, method, object or device. Unless otherwise specified, in the context of "include" or "comprise", the process, method, object or device that includes or comprises the specified elements may include other identical elements.

The above descriptions are merely preferred embodiments of the present disclosure, but not intended to limit the protection scope of the present disclosure. Any modification, equivalent replacement, or improvement made without departing from the spirit and principles of the present disclosure shall fall within the scope of the present disclosure.

What is claimed is:

1. A time checking method, comprising:
  receiving, by a base station, a certificate revocation list (CRL) file as a download response sent by a CRL server, the CRL file including an update time, wherein the receiving of the CRL file as the download response takes place independent of an authentication between the base station and a gateway, which receiving is prior to setting up an Internet key exchange (IKE) security association (SA) between the base station and the security gateway in a subsequent authentication; and
  aligning, by the base station, current time of the base station to the update time of the CRL file.

2. The method according to claim 1, wherein the aligning step comprises:
  regarding, by the base station, the update time included in the CRL file as the current time of the base station which is used for determining validity of a digital certificate of the security gateway.

3. The method according to claim 1, further comprising:
  processing, by the base station, a digital certificate of the security gateway via the update time included in the CRL file to set up the IKE SA between the base station and the security gateway.

4. A time checking method, comprising:
  receiving, by a base station, a certificate revocation list (CRL) file as a file transfer protocol (FTP) handshake response sent by the CRL server, the CRL file including a server current time, wherein the receiving of the CRL file as the FTP handshake response takes place independent of an authentication between the base station and a gateway, which receiving is prior to setting up an internet key exchange (IKE) security association (SA) between the base station and the security gateway in a subsequent authentication; and
  aligning, by the base station, current time of the base station to the current time of the CRL server.

5. The method according to claim 4, wherein the aligning step comprises:

regarding, by the base station, the current time of the CRL server as the current time of the base station which is used for determining validity of a digital certificate of the security gateway.

6. The method according to claim 4, further comprising:
processing, by the base station, a digital certificate of the security gateway via the current time of the CRL server to set up the IKE SA between the base station and the security gateway.

7. A non-transitory computer-readable program product, comprising computer program code, which, when executed by at least a processor in a computer unit of a base station, causes the base station to perform:
receiving by the base station, an update time in a certificate revocation list (CRL) file as a download response sent by a CRL server, the CRL including the update time, wherein the receiving of the CRL file as the response takes place independent of an authentication between the base station and a gateway, which receiving is prior to setting up an internet key exchange (IKE) security association (SA) between the base station and the security gateway in a subsequent authentication; and
aligning current time of the base station to the update time of the CRL file.

8. The computer program product according to claim 7, wherein the aligning step comprises:
regarding the update time of the CRL file as the current time of the base station which is used for determining validity of a digital certificate of the security gateway.

9. The computer program product according to claim 7, wherein the computer program code causes the computer unit to further perform:
processing a digital certificate of the security gateway via the update time of the CRL file to set up the IKE SA between the base station and the security gateway.

10. A non-transitory computer-readable program product, comprising computer program code, which, when executed by at least a processor in a computer unit of a base station, causes the base station to perform:
receiving by the base station from a certificate revocation list (CRL) server, a CRL file as a file transfer protocol (FTP) handshake response sent by the CRL server, the CRL file including a current time and wherein the receiving of the CRL file as the FTP handshake response takes place independent of an authentication between the base station and a gateway, which receiving is prior to setting up an intranet key exchange (IKE) security association (SA) between the base station and the security gateway in a subsequent authentication: and
aligning current time of the base station to the current time of the CRL server.

11. The computer program product according to claim 10, wherein the aligning step comprises:
regarding the current time of the CRL server as the current time of the base station which is used for determining validity of a digital certificate of the security gateway.

12. The computer program product according to claim 10, wherein the computer program code will cause the computer unit to further perform:
processing a digital certificate of the security gateway via the current time of the CRL server to set up the IKE SA between the base station and the security gateway.

* * * * *